Patented Jan. 15, 1946

2,392,881

UNITED STATES PATENT OFFICE 2,392,881

METHOD OF PROTECTING RUBBER PRODUCTS

William L. Rittschof and Wayne A. Proell, Chicago, Ill., assignors to Standard Oil Company, Chicago, Ill., a corporation of Indiana No Drawing. Application May 29, 1943,
Serial No. 489,070

10 Claims. (Cl. 106—14)

The present invention relates to the method of protecting rubber and rubber products in contact with hydrocarbons and more particularly to the method of protecting synthetic rubber in contact with hydrocarbon fuels and oils, especially in the presence of copper or copper-containing materials.

It is well known that both natural and synthetic rubber and products thereof swell when in contact with hydrocarbons such as hydrocarbon fuels and oils. It has also been observed that in addition to the swelling phenomenon rubber, particularly synthetic rubber, when in contact with hydrocarbons, especially when in contact with hydrocarbons having a substantial aromatic content in the presence of copper or copper-containing materials becomes hard and acquires a very badly cracked surface, the latter conditions being referred to as "crazing." This hardening and crazing effect is also accompanied with a loss of strength. It has been observed that rubber diaphragms, particularly synthetic rubber, such as neoprene, which are used in aviation carburetors and which are in contact with aviation fuels deteriorate as evidenced by the crazing effect and loss of strength. This deterioration has also been noted in diaphragms of carburetors during service and in those which have been in storage for some time. It is the usual practice in storing such carburetors to flush out the carburetors with a low viscosity lubricating oil to coat the interior of the carburetor as well as the rubber diaphragm with the oil. Obviously the deterioration of these rubber diaphragms in aviation carburetors presents a very serious problem. This is especially so in localities where, due to the use of motor fuels high in aromatics, failure of synthetic rubber in various parts of the equipment has been experienced, resulting in the grounding of planes.

It is therefore an object of the present invention to provide a method of preventing the deterioration of rubber products in contact with hydrocarbons. Another object of the invention is to provide a hydrocarbon composition which will not cause crazing of rubber products in contact therewith in the presence of copper or copper-containing materials. Still another object of the present invention is to provide a hydrocarbon fuel which will have no detrimental effect upon synthetic rubber in contact therewith. A further object of the invention is to provide a method of protecting synthetic rubber in contact with hydrocarbon liquids having a high aromatic content.

We have discovered that the foregoing objects can be attained by incorporating in hydrocarbons which are to come in contact with rubber particularly in the presence of copper, a small amount; namely, from about 0.0005% to about 1%, preferably from about 0.001% to about 0.5%, of an amine. Although we can employ amines in general we prefer to use polyamines, particularly a polyamine containing at least four amine groups of which two are primary amino groups, especially an aliphatic polyamine. Examples of amines we can use are diethylene triamine, triethylene tetramine and tetraethylene pentamine, phenyl B naphthylamine and the like.

The inhibiting effect of amines under the foregoing conditions is illustrated by the following examples in which test strips of neoprene are immersed in a sample of aviation gasoline having a high aromatic content; in the same gasoline containing 0.01% copper stearate; in another sample of the gasoline containing in addition to the copper stearate, 0.003% triethylene tetramine, and in a fourth sample of the gasoline containing in addition to the copper stearate, 0.003% phenyl B naphthylamine. Since the copper in the aviation carburetors is believed to have an accelerating effect upon the deterioration of the rubber diaphragms, the copper stearate was added to the gasoline used in the test in order to simulate actual conditions. Table I below tabulates the results obtained when strips of neoprene are immersed in the foregoing samples.

*Table I*

| | | Condition of neoprene | | |
|---|---|---|---|---|
| | Sample | 400 hours | 700 hours | 1,900 hours |
| A | Aromatic aviation gasoline | Perfect | Weakened | Severely weakened. |
| B | Aromatic aviation gasoline +0.01% Cu stearate. | Sharp cracks were present over entire submerged portion. | Cracking more pronounced. | Completely disintegrated. |
| C | Aromatic aviation gasoline +0.01% Cu stearate +0.003% triethylene tetramine. | Perfect | Perfect | Perfect. |
| D | Aromatic aviation gasoline +0.01% Cu stearate +0.003% phenyl B naphthylamine. | ----do---- | | Do. |

In a very severe test designed to give results within a short period of time three samples of an aged gasoline, containing a large amount of peroxide and to which was added a small amount of copper stearate, were used. Each of the samples also had immersed therein a copper strip. To one sample a small amount of a known metal deactivator was added, and to another sample a small amount of triethylene tetramine was added. Strips of Neoprene were suspended in each of the samples and the following data obtained.

| | Sample | Results |
|---|---|---|
| 1 | Aged gasoline +0.01% copper stearate + copper strip. | Neoprene failed at 150 hours. |
| 2 | No. 1 +0.003% known copper deactivator. | Neoprene failed at 168 hours. |
| 3 | No. 1 +0.003% triethylene tetramine. | Neoprene failed at 216 hours. |

The above data demonstrates the effectiveness of the polyamine in inhibiting the deterioration of the synthetic rubber even under conditions much more severe than would ever be encountered in actual practice. The data also show that under similar conditions a known copper deactivator was relatively ineffective in inhibiting the deterioration of the synthetic rubber.

For the protection of rubber materials so situated as not to lend themselves to the use of an oil-inhibitor protective mixture during storage, a slushing type compound, in which the amine inhibitor is used in a wax or petrolatum or in a mixture of a wax or petrolatum and oil, can be employed.

The present invention is not to be considered as limited by the herein described specific embodiments thereof, which are given by way of illustration only, but is to be limited solely by the terms of the appended claims.

We claim:

1. The method of preventing the crazing of synthetic rubber in contact with liquid aromatic hydrocarbons which normally cause crazing of said synthetic rubber comprising employing in contact with said synthetic rubber liquid aromatic hydrocarbons containing from about 0.0005% to about 1% of an aliphatic polyamine containing at least four amine groups of which two are primary amino groups.

2. The method of preventing the crazing of synthetic rubber in contact with liquid hydrocarbons as described in claim 1 in which the polyamine is an alkylene polyamine.

3. The method of preventing the crazing of synthetic rubber in contact with liquid hydrocarbons as described in claim 1 in which the polyamine is triethylene tetramine.

4. The method of inhibiting the deterioration of synthetic rubber in contact with liquid aromatic hydrocarbons in the presence of copper comprising employing in contact with said synthetic rubber liquid aromatic hydrocarbons containing from about 0.0005% to about 1% of an aliphatic polyamine containing at least four amine groups of which two are primary amino groups.

5. The method described in claim 4 in which the aliphatic polyamine is an alkylene polyamine.

6. The method described in claim 4, in which the aliphatic polyamine is triethylene tetramine.

7. The method of inhibiting the deterioration of synthetic rubber in contact with a motor fuel containing a substantial amount of liquid aromatic hydrocarbons which normally cause crazing of said synthetic rubber in the presence of copper, comprising employing in contact with said synthetic rubber a motor fuel containing a substantial amount of aromatic hydrocarbons to which is added from about 0.0005% to about 1% of an aliphatic polyamine containing at least four amine groups of which two are primary amino groups.

8. The method described in claim 7 in which the aliphatic polyamine is triethylene tetramine.

9. The method of prolonging the life of synthetic rubber diaphragms in carburetors of internal combustion engines employing a motor fuel having a substantial aromatic content and which normally causes deterioration of the synthetic rubber diaphragms in said carburetors, comprising employing in contact with said synthetic rubber diaphragms a motor fuel having a substantial aromatic content and containing from about 0.0005% to about 1% of an aliphatic polyamine containing at least four amine groups of which two are primary amino groups whereby the deterioration of said synthetic rubber diaphragms is substantially inhibited.

10. The method of inhibiting the deterioration of synthetic rubber in contact with a motor fuel containing a substantial amount of liquid aromatic hydrocarbons which normally cause crazing of said synthetic rubber comprising employing in contact with said synthetic rubber a motor fuel containing a substantial amount of an aromatic hydrocarbon and from about 0.0005% to about 1% of an aliphatic amine containing at least four amine groups of which two are primary amino groups.

WILLIAM L. RITTSCHOF.
WAYNE A. PROELL.